United States Patent
Hinrichs et al.

(10) Patent No.: US 11,775,444 B1
(45) Date of Patent: Oct. 3, 2023

(54) FETCH REQUEST ARBITER

(71) Applicant: International Business Machines Corporation, Armonk, NY (US)

(72) Inventors: Willm Hinrichs, Holzgerlingen (DE); Markus Kaltenbach, Tübingen (DE); Simon Hermann Friedmann, Boeblingen (DE); Joerg Deutschle, Winnenden (DE); Thomas G. Koehler, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/694,861

(22) Filed: Mar. 15, 2022

(51) Int. Cl.
*G06F 12/1045* (2016.01)

(52) U.S. Cl.
CPC .. *G06F 12/1045* (2013.01); *G06F 2212/1021* (2013.01)

(58) Field of Classification Search
None
See application file for complete search history.

(56) References Cited

U.S. PATENT DOCUMENTS

| | | | |
|---|---|---|---|
| 6,766,434 B2 | 7/2004 | Gaertner | |
| 7,386,851 B1 * | 6/2008 | Zyuban | G06F 11/2051 714/763 |
| 7,539,840 B2 | 5/2009 | Irish | |
| 9,715,458 B2 | 7/2017 | Koehler | |
| 10,067,796 B1 | 9/2018 | Metcalf | |
| 10,210,092 B1 | 2/2019 | Miao | |
| 10,599,569 B2 | 3/2020 | Blaner | |
| 10,901,913 B2 | 1/2021 | Zbiciak | |
| 10,936,504 B2 | 3/2021 | Parker | |
| 11,119,779 B2 | 9/2021 | Zbiciak | |
| 2019/0018772 A1 * | 1/2019 | Hinrichs | G06F 12/0862 |
| 2019/0018792 A1 * | 1/2019 | Kaltenbach | G06F 9/3824 |
| 2019/0108027 A1 * | 4/2019 | Lloyd | G06F 12/1063 |

OTHER PUBLICATIONS

"Address Mode Aware Branch Prediction With Shutdown Capability", An IP.com Prior Art Database Technical Disclosure, IP.com No. IPCOM000235852D, IP.com Electronic Publication Date: Mar. 27, 2014, 6 pps.

"Method for Handling Collisions Between Two-Pass Translation Look-Ups, Invalidations and Reload Operations in a TLB Pipeline", An IP.com Prior Art Database Technical Disclosure, IP.com No. IPCOM000267214D, IP.com Electronic Publication Date: Oct. 4, 2021, 12 pps.

(Continued)

*Primary Examiner* — Yaima Rigol
(74) *Attorney, Agent, or Firm* — David K. Mattheis (57) ABSTRACT

Driving address translations in a microprocessor system by sending a rejected Lx+1 cache request from a first set of caches of a first level Lx to a central request unit, transferring an Lx+1 cache request having a translation of a virtual address into a physical address stored in a first buffer, from the central request unit to the at least one Lx+1 cache, and keeping an Lx+1 cache request lacking a translation of a virtual address into a physical address stored in the first buffer, pending in the central request unit.

17 Claims, 6 Drawing Sheets

(56) References Cited

OTHER PUBLICATIONS

"Simultaneous Data Prefetch Request Probing and Recycled Data Forwarding From a Load Store Unit", An IP.com Prior Art Database Technical Disclosure, IP.com No. IPCOM000221102D, IP.com Electronic Publication Date: Aug. 29, 2012, 7 pps.

Mell et al., "The NIST Definition of Cloud Computing", National Institute of Standards and Technology, U.S. Department of Commerce, NIST Special Publication 800-145, Sep. 2011, 7 pages.

Nakka, et al., "An Architectural Framework for Providing Reliability and Security Support", Conference Paper ■ Jan. 2004, 26 pps.

\* cited by examiner

FETCH REQUEST ARBITER

FIELD OF THE INVENTION

The disclosure relates generally to cache-level fetch request arbiters. The disclosure relates particularly to driving efficient address translation through a fetch request arbiter.

BACKGROUND

In general, a data fetch request between respective device cache levels requires an address translation from a virtual to an absolute memory address, executed by a dedicated translation unit, which includes a pipeline to look up the absolute address in a Translation Look-aside Buffer (TLB) for the fetch request. The TLB lookup pipeline delivers a fast translation result in case of a TLB hit, an instance where the absolute address currently resides in the TLB. In case of a TLB miss, where the absolute address does not currently reside in the TLB, new address translation tables associated with the fetch request need to be loaded into the TLB before the TLB lookup can be restarted to complete with a TLB hit. The fetch request must be restarted by the original requestor and may result in a miss again if the necessary table has not yet been loaded in the TLB.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable driving address translation in a microprocessor system.

Aspects of the invention disclose methods, systems and computer readable media associated with driving address translations in a microprocessor system having at least Lx and Lx+1 levels of cache memory, by sending a rejected Lx+1 cache request from a first set of caches of a first level Lx to a central request unit, transferring an Lx+1 cache request having a translation of a virtual address into a physical address stored in a first buffer, from the central request unit to the at least one Lx+1 cache, and keeping an Lx+1 cache request lacking a translation of a virtual address into a physical address stored in the first buffer, pending in the central request unit.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Cloud services, big data analytics and artificial intelligence (AI) computing include increased demands on high data throughput in multiprocessor systems and their hierarchical cache and storage architectures.

In a microprocessor system with a multi-level cache subsystem, a cache miss in one level usually triggers a data fetch request to the next level. Cache miss latency contributes to system performance levels in any microprocessor design. Reducing cache miss latency results in a higher performing system.

A fetch request from one cache level to the next level may also require an address translation from a virtual address, used by the microprocessor program and its associated cache(s), to an absolute address used by the next cache level in order to fetch the data. In a multiprocessor example, a fetch request from an L1/L2 cache to an L3 cache requires such an address translation.

Resolving TLB misses by the address translation unit can take significantly longer, since several translation steps might be involved through virtualization levels, which might trigger additional table fetch requests to write the TLB with new table data. In a typical system, the address translation unit turns out to be a bottleneck for sending out successful fetch requests with an absolute address to the next cache level.

Aspects of the present invention relate generally to handling escalating missed cache address translation requests. In embodiments, a request central station, or fetch request arbiter, receives Lx+1 cache requests rejected for a variety of reasons. The arbiter calculates a request priority for each rejected request, then prioritizes the requests, sorting and passing requests according to the nature of the respective rejections reflected in the respective calculated priorities of the rejected requests. Disclosed methods pass requests having an absolute, or physical address, translation of the virtual translation of the request in a translation look aside buffer (TLB), on to the Lx+1 level cache for completion of the request and return of the data from the Lx+1 cache to the Lx level requestor. The arbiter retains rejected requests lacking an absolute translation of the virtual address in the TLB.

In accordance with aspects of the invention a method for efficiently and automatically arbitrating rejected Lx+1 cache requests according to the reasons for the rejections of the requests includes receiving rejected Lx+1 cache requests including a virtual address, determining the presence or absence of a corresponding absolute physical address in a TLB, and passing along requests having a corresponding address in the TLB to the Lx+1 cache level. Next, requests rejected for want of a table fetch for a new table of absolute addresses are passed to the Lx+1 cache for processing after that defect has been cured, then requests rejected for want of sufficient Lx+1 processing resource (credits) are passed for processing as resource credits become available. Finally, other rejected requests are submitted for processing.

Aspects of the invention provide an improvement in the technical field of microprocessor systems having multi-level cache memory structures. Conventional cache structures return rejected Lx+1 requests to the Lx level requestor requiring multiple computing cycles for restarting the Lx+1 request, which may once again be rejected. Disclosed embodiments pass rejected Lx+1 requests to a fetch arbiter which in turn calculates a priority and sorts the rejected requests according to the nature of the respective rejections reflected in the calculated priority, and efficiently passes those requests most likely to be completed on to the Lx+1 cache for processing. Proceeding in a prioritized order from those rejected request most likely to be competed to those rejected request least likely to be completed, regardless of the order of receipt of the respective requests. For example, a newly received request having a high likelihood of completion as the TLB contains an absolute address corresponding the virtual address of the request passes to the Lx+1 cache before an older request still waiting on completion of an associated table fetch request.

Aspects of the invention also provide an improvement to computer functionality. In particular, implementations of the invention are directed to a specific improvement to the way Lx+1 fetch requests are processes, embodied in continually prioritizing a queue of rejected Lx+1 requests and passing along those Lx+1 requests most likely to successfully be completed. In embodiments, the system arbitrates the processing of rejected Lx+1 requests as system conditions change and as the reasons for the rejection of specific Lx+1 requests cease to be relevant, e.g., Lx+1 processing resources become available, table fetch requests complete such that TLB lookup tables load which include addresses corresponding to rejected request virtual addresses, etc. This reduces cache miss latency for the system as a whole.

As an overview, a fetch arbiter receives Lx+1 cache requests initiated by Lx level requestors and subsequently rejected by any one of the TLB arbitrator, the translation unit for a TLB miss, or the Lx+1 pipeline for want of sufficient resources. The fetch arbiter continuously calculates rejected requests priorities and sorts requests according to the calculated priority of the received rejected requests and monitors the system state in view of the respective reasons for the rejections, as the reasons for rejections clear, and requests become viable, the fetch arbiter passes the requests on to the Lx+1 caches for processing. In this manner, the Lx requestor creates and passes the Lx+1 request on once, and receives the requested data without any need to receive and deal with rejected Lx+1 requests by restarting such rejected requests.

In an embodiment, one or more components of the system can employ hardware and/or software to solve problems that are highly technical in nature (e.g., receiving a rejected Lx+1 cache request by a central request arbiter, transferring a rejected request having a physical address stored in a TLB which corresponds to a virtual address of the request, retaining a rejected request lacking a physical address stored in a TLB which corresponds to a virtual address of the request, etc.). These solutions are not abstract and cannot be performed as a set of mental acts by a human due to the processing capabilities needed to facilitate efficient handling of rejected Lx+1 cache requests, for example. Further, some of the processes performed may be performed by a specialized computer for carrying out defined tasks related to Lx+1 cache request handling. For example, a specialized computer can be employed to carry out tasks related to rejected cache fetch request handling, or the like.

Figure 1:
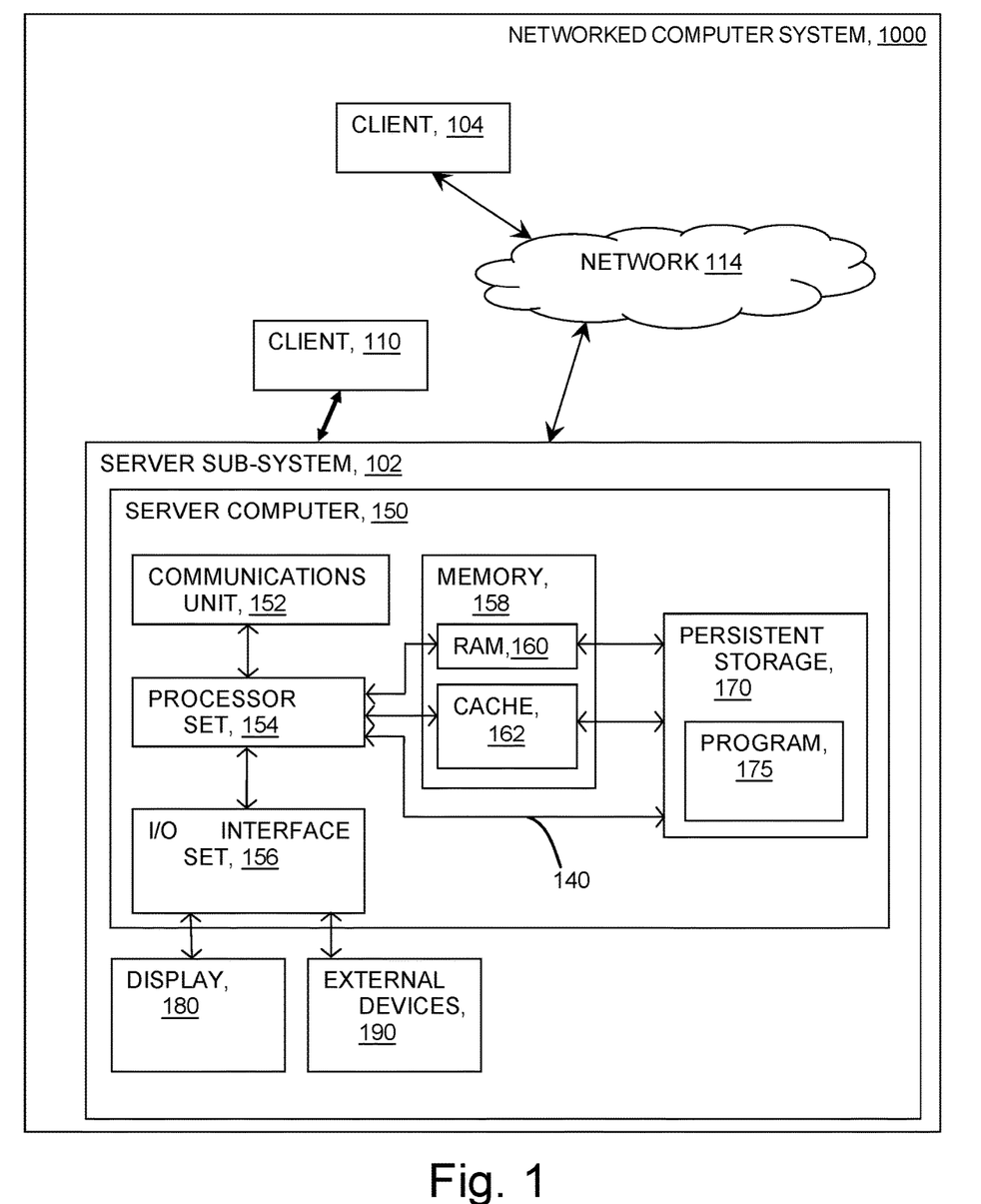
FIG. 1 provides a schematic illustration of a computing environment, according to an embodiment of the invention.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise timeseries data set selection program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158. Disclosed embodiments arbitrate transaction requests between respective cache levels, reducing the latency of such requests for the overall system.

Program instructions and data used to practice embodiments of the present invention, e.g., the fetch request handling arbiter program 175, are stored in persistent storage 170 for execution and/or access by one or more of the respective processor(s) 154 of server computer 150 via cache 162. Cache 162 may include various levels Lx of hierarchical cache addresses with disclosed embodiments handling requests ascending the hierarchy in search of data, instructions, and addresses which are not available at lower cache levels. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., fetch request handling arbiter program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Typically, Lx cache requestors can trigger different kinds of Lx+1 requests to the next Lx+1 cache level, such as instruction, data, or table fetch requests, triggered by multiple Lx processing pipelines. These fetch requests compete for limited address translation resources in the address translation unit (XU). At a first TLB stage, only one request might win TLB arbitration to enter the TLB lookup pipeline, and other requests are pushed back to the requestors (TLB arbitration rejects). At the end of the TLB lookup pipeline, the request might also be pushed back to the requestor because of a TLB miss (TLB miss rejects). The reject could happen for several reasons: a translation may have been started to resolve the TLB miss, or a translation could not even be started due to limited translation resources.

The number of fetch requests pending in the Lx+1 cache might also be limited due to a lack of available resources. Hence another reject signal from the Lx+1 request pipeline might be set, when a fetch request can't be sent to the L1+x cache since the resource credit limit has been reached.

For all reject cases, the request typically needs to be restarted by the Lx cache requestor once the dependency has been resolved. One drawback is that the reject/restart interface between the requestors and the address translation unit requires extra processing cycles before the relevant defects may be resolved and a fetch request can be successfully sent to the next cache level.

Furthermore, in a typical system, new fetch requests, and requests which have been restarted from different requestors, may be sent to the address translation unit in an uncoordinated way. There is typically no prioritized arbitration scheme for requests from different requestors to resolve address translations across different requests. One fetch request could overrule other fetch requests and be sent to the translation unit despite the relative age and timing of the receipt of the respective requests, or the dependency of one request upon other fetch requests which need to be resolved first. As an example: a table fetch request created to resolve a TLB miss, needs to be processed before another fetch request can do a successful address translation based on table fetch data. Disclosed embodiments provide a fetch request arbiter, which monitors and drives address translations to overcome performance drawbacks of prior art. It enables fair and prioritized arbitration of pending fetch requests to the next cache level.

Figure 2:
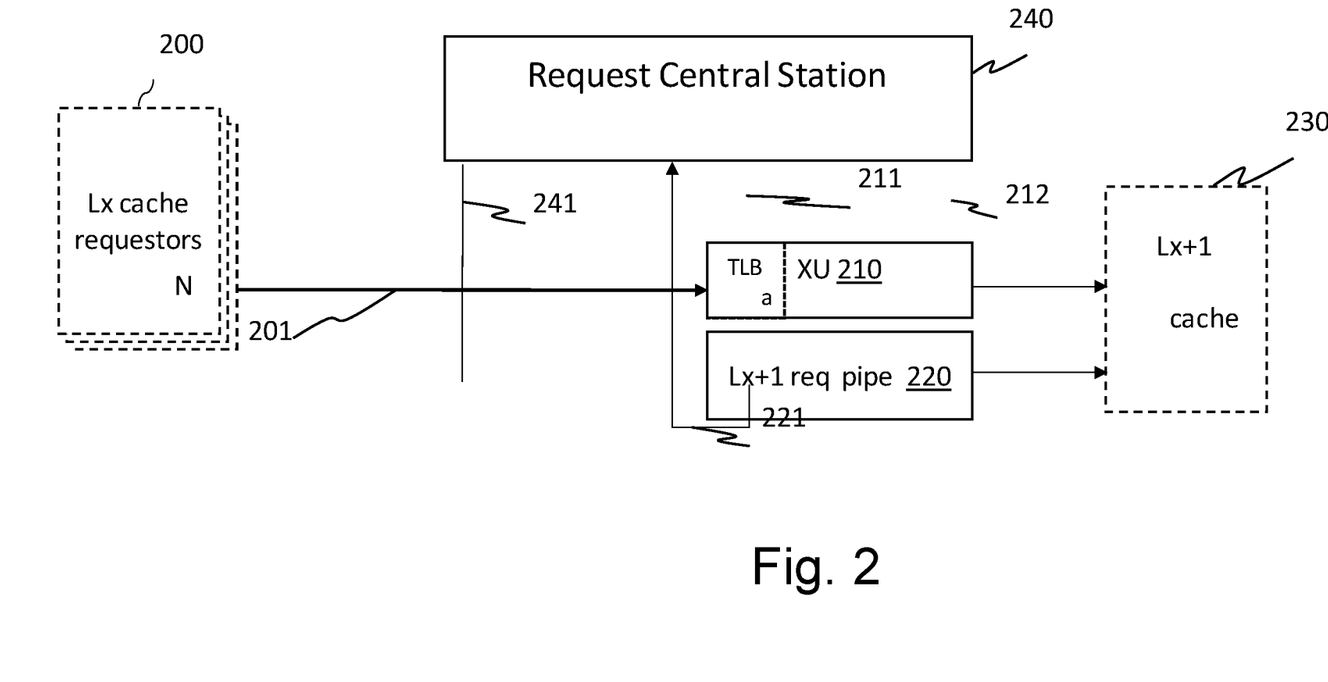
FIG. 2 provides a system schematic depicting the handling of rejected fetch requests, according to an embodiment of the invention.

In an embodiment shown in FIG. 2, a Request Central Station (RCS) 240, functions as a buffer and arbitration station for fetch requests 201, requiring address translations, to the next memory cache level 230. Every Lx cache requestor 200, sends Lx+1 requests 201, to RCS 240, in order to enable RCS 240, to monitor the state of the fetch request from the address translation unit (XU) 210, and from the Lx+1 request pipeline 220. Any reject reason for the fetch request will be reported to RCS, such as a TLB arbitration reject 211, a TLB miss reject 212, and/or a Lx+1 resource credit reject 221. Any reject reason prevents the sending of the request to the Lx+1 cache 230.

The state of each request 201, is tracked in RCS 240, to restart the request once a reject reason has been resolved. From the perspective of the Lx cache requestor 200, a request 201, does not return, but instead moves forward as an RCS request 241, to the address translation unit 210, and to the Lx+1 request pipeline. If the fetch request has been successfully sent to the Lx+1 cache 230, the request 201 is complete from RCS 240 point of view, and the Lx cache requestor units 200, can wait for a response from Lx+1 230.

RCS-XU interaction allows faster processing and completion of Lx+1 requests 201, as the Lx+1 fetch requests 201, need not be pushed-back/rejected to Lx units 200, if XU translation resources 210, are limited or busy. This reduces the restart time of rejected fetch requests. Further RCS 240 can prioritize Lx+1 fetch requests 201, to be selected in a prioritized order, higher priority requests selected before other requests can make progress (e.g. table fetch over data fetch). This allows fair arbitration and efficient completion of Lx+1 requests in the presence of limited address translation resources.

The Lx+1 request pipeline can be started in parallel to the TLB-lookup pipeline to drive the requests in parallel with the absolute address lookup request on the interface to the Lx+1 cache. Lx+1 fetch requests do not need to be queued up after successful address translation, before sending such requests on to the Lx+1 cache.

Figure 3:
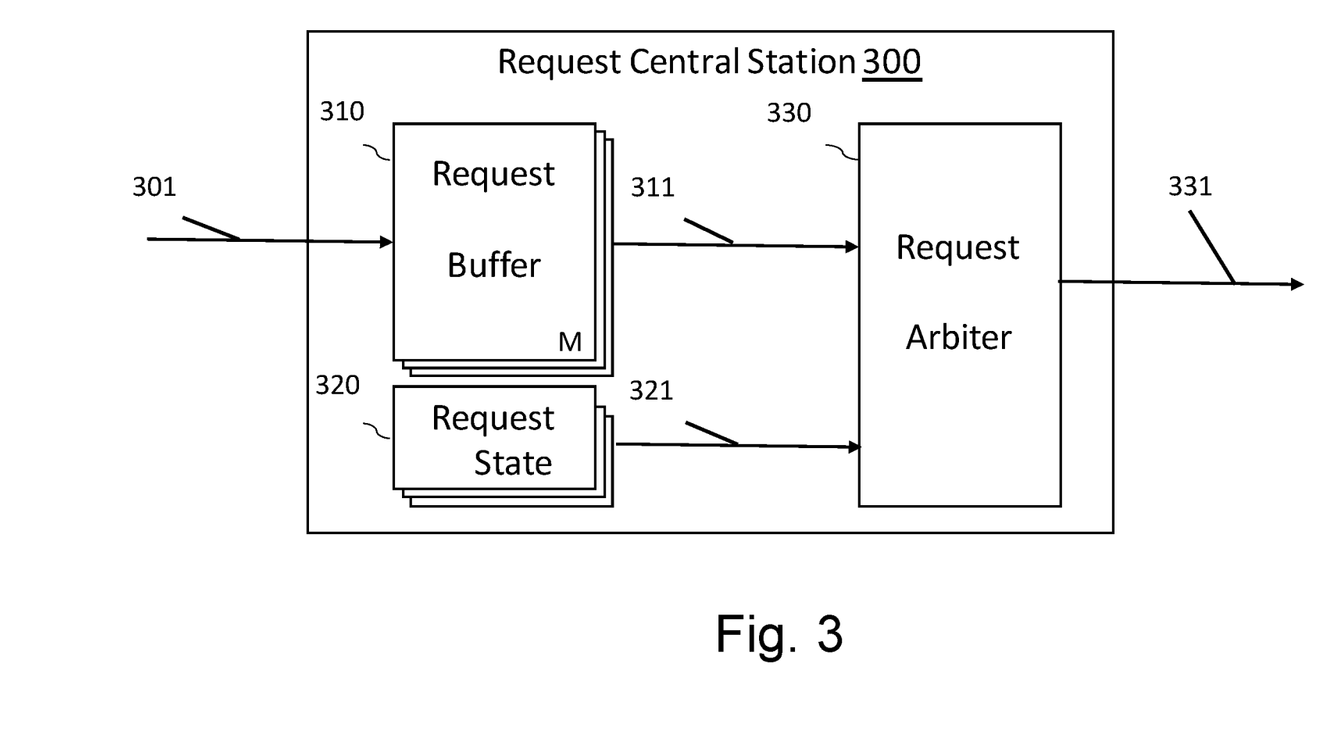
FIG. 3 provides a system schematic of a request central station fetch arbiter, according to an embodiment of the invention.

In an embodiment, shown in FIG. 3, the request central station (RCS) 300, includes request buffer 310 which receives multiple Lx+1 fetch requests 301, from Lx requestors. Some requests may be received simultaneously. In an embodiment, the RCS assigns each received request a unique request identifier, and the total number of pending requests is limited. In an embodiment, the number is pending requests is not limited and the RCS buffer holds all pending requests.

In an embodiment, request state 320 of RCS 300, assigns a request state 321, to each request 301 stored in a second buffer 310 according to the request identification. The assigned request state 321, comprises additional information regarding: request validity/invalidity, the request lost TLB arbitration, the request was rejected due to limited translation resources, the request has started translation, any dependency holding up the request has been resolved, and any rejection due to limited resources has been resolved. Each of the buffer 310, and request state 320, provide inputs of buffered requests 311, and request states 321, to the request arbiter 330, which selects fetch requests 331, to pass to the Lx+1 cache according to the request state inputs indicating that all conditions for successfully looking up the physical address of the request in the TLB, are met and the request may be sent to the Lx+1 cache.

Figure 4:
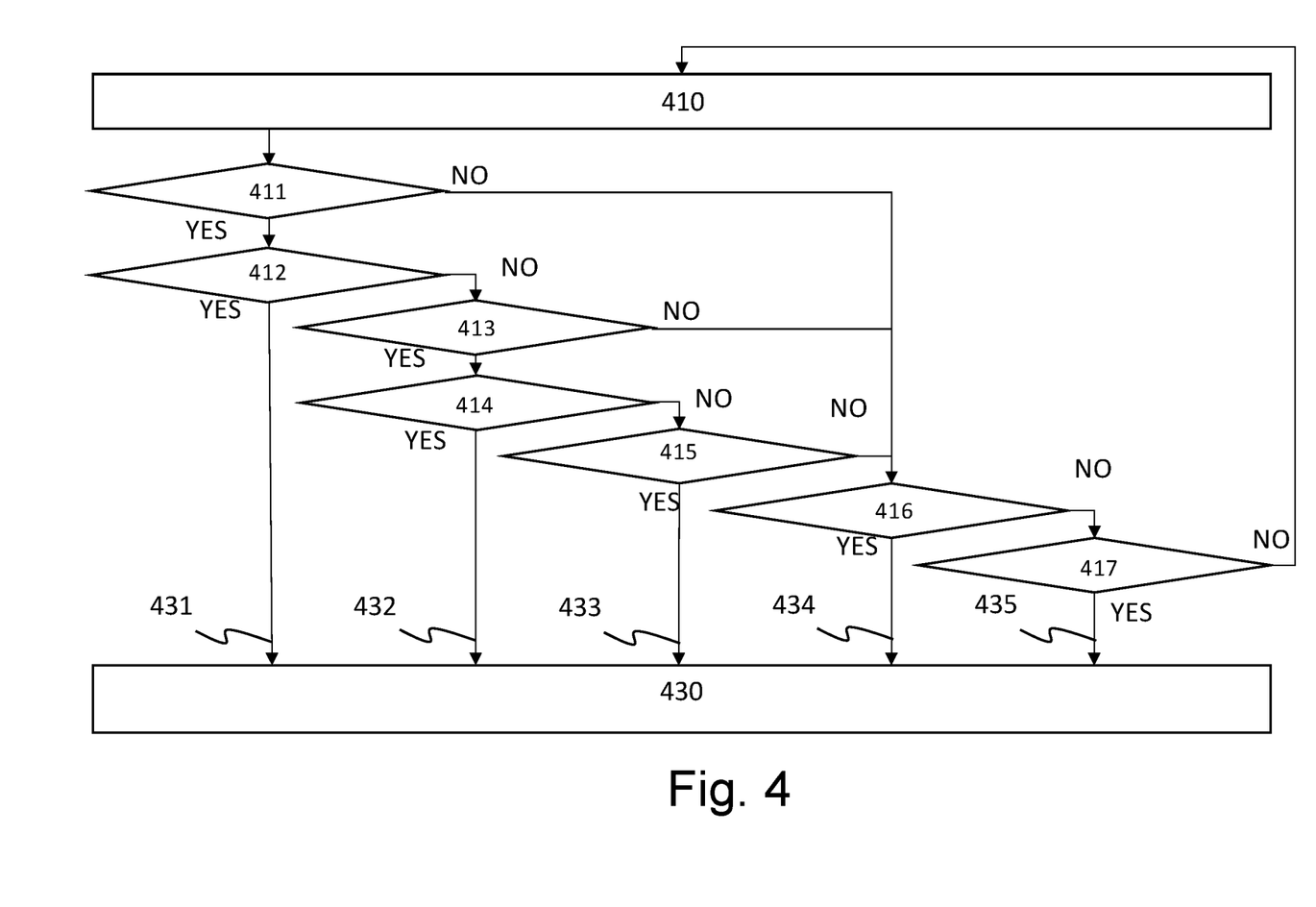
FIG. 4 depicts an RCS prioritization process, according to an embodiment o the invention.

FIG. 4 illustrates prioritization of buffered received rejected fetch requests by RCS 300 of FIG. 3, according to the reason for the rejection and the current request state. RCS 300 arbitrates valid buffered requests, requests having translation dependencies resolved, other requests, and requests having Lx+1 processing resource credit available presented for arbitration at 410. As shown in the Figure, fetch arbiter RCS 300, selects request which started translation 431, when the translation for this request finished 411, and the TLB miss gets resolved by updating the TLB 412. Next in line, RCS 300 selects a table fetch (TF) request which was rejected for translation 432, when rejected requests are present 413, and a table fetch request is present 414. Otherwise, RCS 300 selects another fetch request which was rejected 433, when present 415. Otherwise, RCS 300 selects a request which lost Lx+1 resource credit 434, when Lx+1 resource credit becomes available 416. Otherwise, RCS 300 selects any other fetch request 435, when present 417. Selected requests pass to the Lx+1 cache at 430. Otherwise, RCS 300 loops back to 410 and waits for requests ready to be scheduled for arbitration.

In an embodiment, an early restart of the fetch request may be generated by a translation engine from a final table fetch response. In this embodiment, the Lx+1 request starts the TLB lookup which results in a TLB miss. In parallel, the Lx+1 request valid request, must be cancelled. The TLB miss starts a translation engine request for table fetch data for the required address translation. Data being returned on the table fetch is processed by a pipelined sequence on the table fetch data interface. This sequence includes: a Table Fetch data warn indicator, notifying the requesting translation engine of a potential advance data return, a Table Fetch data speculative indicator, accompanied by table data being returned, but not yet confirmed, a Table Fetch confirm indicator, acknowledging the final Table fetch return.

In this embodiment, the Table Fetch data speculative indicator can be driven according to a set predictor from the sender of table fetch data. If the set predictor is not set, the table fetch data is invalid. The set predictor signal can over-indicate valid data (due to cache-collisions or wrong prediction), therefore a precise Table Fetch data confirm indicator is required to qualify the returned table fetch data as valid.

In this embodiment, the generated early restart request starts in parallel with receipt of the Table Fetch data warn indicator. With receipt of the Table Fetch data speculative indicator, the Lx+1 request advances to include an Lx+1 request valid message. The Lx+1 request absolute address proceeds from the returned Table Fetch data, and upon receipt of a Table fetch data confirm notice, to the Lx+1 cache to complete the request. If the returned Table Fetch data is not confirmed, the method cancels the Lx+1 request valid instead.

The TLB is still updated by returned Table Fetch data for use in the lookup of the absolute addresses for later requests. When the initial Lx+1 request has been successfully completed by the early restart request, a restart of the Lx+1 request is no longer required.

In an embodiment, the Lx+1 request triggers an address translation lookup in the TLB. In case of a TLB hit, the absolute address is selected from the TLB by a multiplexer, and the method sends the absolute address of the Lx+1 request to the Lx+1 cache, in coincidence with the Lx+1 request valid and command signals using by the Lx+1 request pipeline. For a TLB miss, the method starts a Translation Engine. The translation engine receives the table data from the Table fetch data interface. Table fetch data might be returned by a pipelined sequence given by a TF data warn indicator, a TF data speculative indicator, accompanied by TF data, and a TF confirm indicator. From the final Table fetch, the method routes the absolute address to the multiplexer and selects by an early restart indicator. Concurrently, the early restart indicator selects the Lx+1 request from a Request Buffer. In an embodiment, the RCS includes the request buffer. In an embodiment, the method drives the request as an early restart request into the Lx+1 request pipeline. Finally, the method sends the Lx+1 request absolute address (431) in coincidence with the Lx+1 request valid and command signals, which completes the fetch request to the next Lx+1 cache level.

In a specific implementation, the pipelined sequence of table fetch data can be exploited to derive early restart controls and provide an early restart absolute address in order to send Lx+1 request absolute address and Lx+1 request valid/command, in coincidence to the next Lx+1 cache level, to select the early restart absolute address by the early restart indicator one or more pipeline stages ahead of the Lx+1 request absolute address interface; to avoid timing-critical logic paths, which violate the processor cycle time target, and to speculatively trigger the generated early restart to select the early restart request from the RCS, and use the final TF data confirmation at a later pipeline stage to optionally acknowledge, or cancel, the Lx+1 request valid to the next Lx+1 cache level.

In an embodiment, the Request Control Station restarts buffered Lx+1 requests for TLB lookup after TLB miss resolution. In this embodiment, the RCS uses the early restart trigger to overrule the default arbitration scheme of the Request Control Station and drive the early restart request instead.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
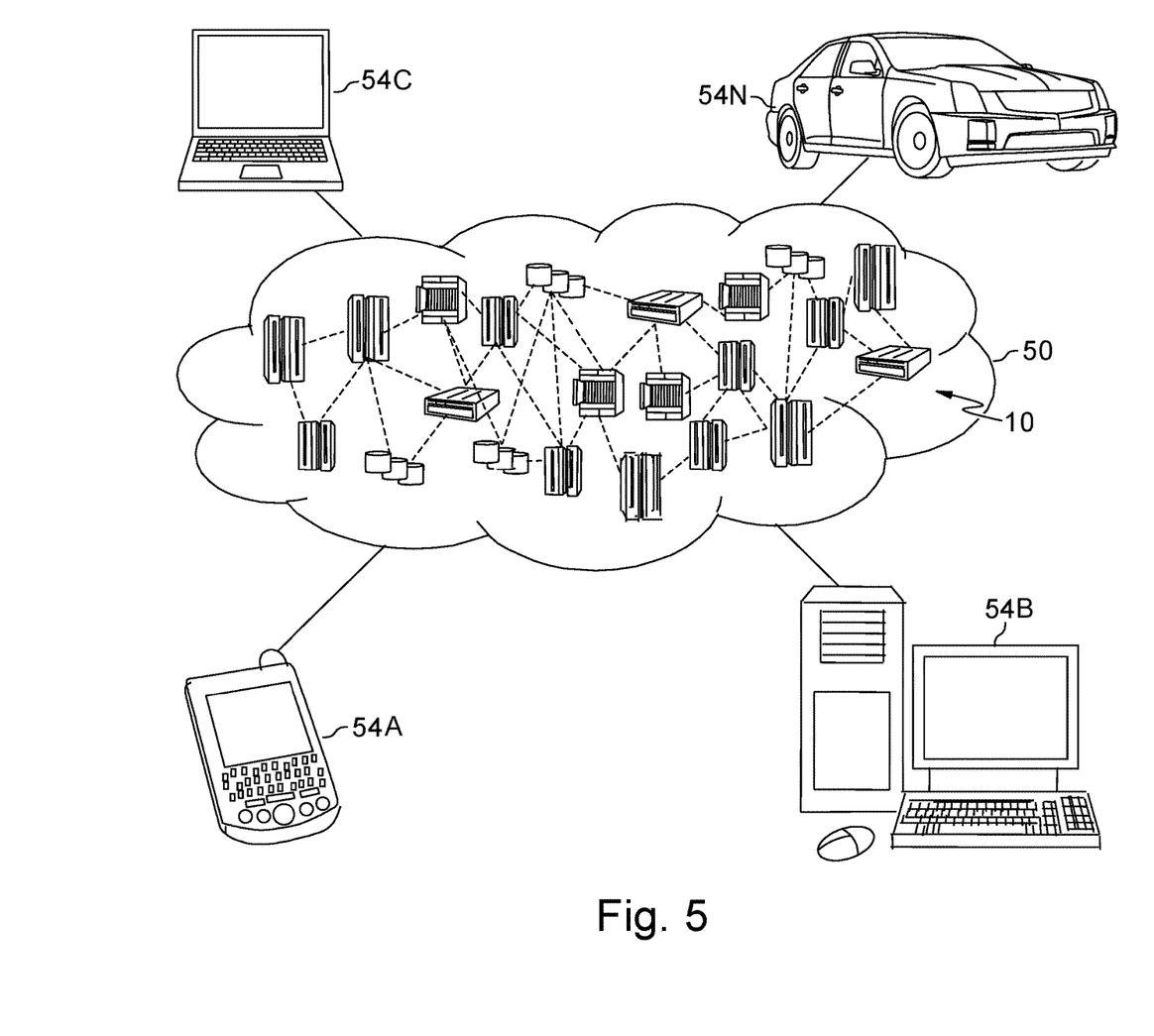
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
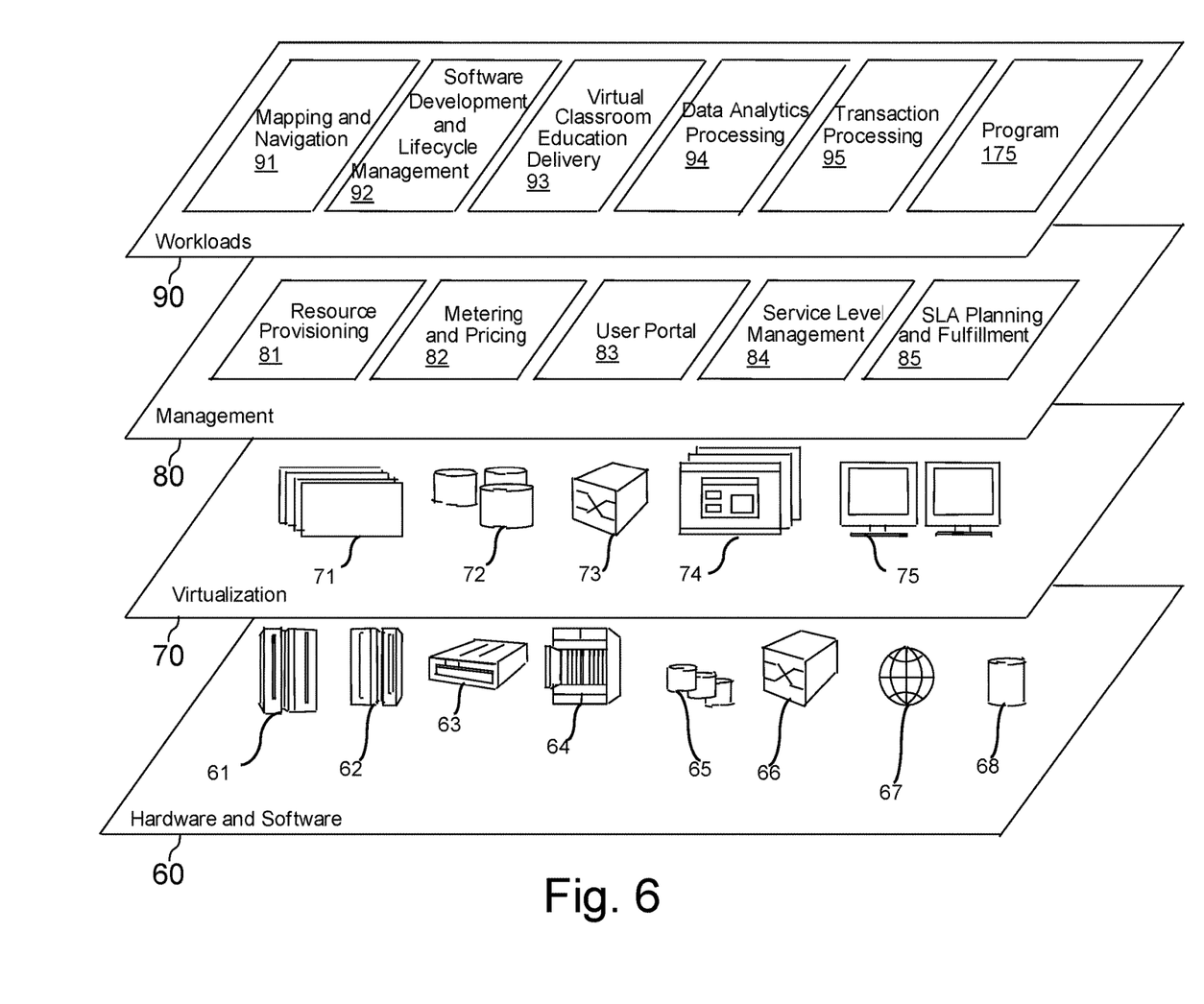
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6, are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fetch request handling arbiter program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for driving address translations in a microprocessor system, the method comprising:
   sending, by one or more computer processors, a rejected cache memory level Lx+1 cache request from a first set of caches of a first cache memory level Lx to a central request unit;
   storing, by the one or more computer processors, additional information for each of the cache memory level Lx+1 cache requests in a second buffer;
   calculating, by a request arbiter in the central request unit, a priority of the cache memory level Lx+1 cache requests based on the additional information;
   sorting, by the one or more computer processors, the cache memory level Lx+1 cache requests based on the priority;
   translating, by the one or more computer processors, the virtual address of the cache memory level Lx+1 cache requests to a physical address according to the sorting; and
   transferring, by the one or more computer processors, a cache memory level Lx+1 cache request having a translation of a virtual address into a physical address stored in a first buffer, from the central request unit to the at least one Lx+1 cache memory level.

2. The method according to claim 1, further comprising:
   generating, by the one or more computer processors, a restart of the cache memory level Lx+1 cache request according to a rejection of a request for the translation of a virtual address into a physical address for the Lx+1 cache memory level.

3. The method according to claim 1, further comprising:
   generating, by the one or more computer processors, a restart of the cache memory level Lx+1 cache request according to a rejection of a request for lack of cache memory level Lx+1 resource credit.

4. The method according to claim 1, wherein the rejected cache memory level Lx+1 cache request comprises a translation lookup buffer arbitrator reject.

5. The method according to claim 1, wherein the rejected cache memory level Lx+1 cache request comprises a cache memory level Lx+1 resource credit reject.

6. Currently amended) The method according to claim 1, wherein the rejected cache memory level Lx+1 cache request comprises a translation lookup buffer miss reject.

7. A computer program product for driving address translation in a microprocessor system, the computer program product comprising one or more computer readable storage media and collectively stored non-transitory program instructions on the one or more computer readable storage media, which when executed cause a processor to:
   send a rejected cache memory level Lx+1 cache request from a first set of caches of a first cache memory level Lx to a central request unit;
   store additional information for each of the cache memory level Lx+1 cache requests in a second buffer;
   calculate, by a request arbiter in the central request unit, a priority of the cache memory level Lx+1 requests based on the additional information;
   sort the cache memory level Lx+1 cache requests based on the priority;
   translate the virtual address of the cache memory level Lx+1 cache requests to a physical address according to the priority; and
   transfer a cache memory level Lx+1 cache request having a translation of a virtual address into a physical address stored in a first buffer, from the central request unit to the at least one Lx+1 cache memory level.

8. The computer program product according to claim 7, the stored program instructions further causing the processor to:
   generate a restart of the cache memory level Lx+1 cache request according to a rejection of a request for the translation of a virtual address into a physical address for the Lx+1 cache memory level.

9. The computer program product according to claim 7, the stored program instructions further causing the processor to:
   generate a restart of the cache memory level Lx+1 cache request according to a rejection of a request for lack of cache memory level Lx+1 resource credit.

10. The computer program product according to claim 7, wherein the rejected cache memory level Lx+1 cache request comprises a translation lookup buffer arbitrator reject.

11. The computer program product according to claim 7, wherein the rejected cache memory level Lx+1 cache request comprises a cache memory level Lx+1 resource credit reject.

12. The computer program product according to claim 7, wherein the rejected cache memory level Lx+1 cache request comprises a translation lookup buffer miss reject.

13. A computer system for driving address translation in a microprocessor system, the computer system comprising:
one or more computer processors;
one or more computer readable storage media; and
stored non-transitory program instructions on the one or more computer readable storage media for execution by the one or more computer processors, which when executed cause a processor to:
send a rejected cache memory level Lx+1 cache request from a first set of caches of a first cache memory level Lx to a central request unit;
store additional information for each of the cache memory level Lx+1 cache requests in a second buffer;
calculate, by a request arbiter in the central request unit, a priority of the cache memory level Lx+1 requests based on the additional information;
sort the cache memory level Lx+1 cache requests based on the priority;
translate the virtual address of the cache memory level Lx+1 cache requests to a physical address according to the priority; and
transfer a cache memory level Lx+1 cache request having a translation of a virtual address into a physical address stored in a first buffer, from the central request unit to the at least one Lx+1 cache memory level.

14. The computer system according to claim 13, the stored program instructions further causing the processor to:
generate a restart of the cache memory level Lx+1 cache request according to a rejection of a request for the translation of a virtual address into a physical address for the Lx+1 cache memory level.

15. The computer system according to claim 13, the stored program instructions further causing the processor to:
generate a restart of the cache memory level Lx+1 cache request according to a rejection of a request for lack of cache memory level Lx+1 resource credit.

16. The computer system according to claim 13, wherein the rejected cache memory level Lx+1 cache request comprises a translation lookup buffer arbitrator reject.

17. The computer system according to claim 13, wherein the rejected cache memory level Lx+1 cache request comprises a cache memory level Lx+1 resource credit reject.

* * * * *